(12) United States Patent
Khanna

(10) Patent No.: US 11,569,979 B2
(45) Date of Patent: Jan. 31, 2023

(54) CRYPTOGRAPHIC SYSTEMS WITH VARIABLE LAYOUT CRYPTOGRAPHY

(71) Applicant: Sameer Khanna, Cupertino, CA (US)

(72) Inventor: Sameer Khanna, Cupertino, CA (US)

( * ) Notice: Subject to any disclaimer, the term of this patent is extended or adjusted under 35 U.S.C. 154(b) by 261 days.

(21) Appl. No.: 16/890,878

(22) Filed: Jun. 2, 2020

(65) Prior Publication Data

US 2020/0389289 A1    Dec. 10, 2020

Related U.S. Application Data

(60) Provisional application No. 62/857,657, filed on Jun. 5, 2019.

(51) Int. Cl.
| | | |
|---|---|---|
| *H04L 9/06* | (2006.01) | |
| *H04L 9/30* | (2006.01) | |
| *H04L 9/14* | (2006.01) | |

(52) U.S. Cl.
CPC .............. *H04L 9/0625* (2013.01); *H04L 9/14* (2013.01); *H04L 9/30* (2013.01)

(58) Field of Classification Search
CPC ............ H04L 9/0625; H04L 9/14; H04L 9/30
See application file for complete search history.

(56) References Cited

U.S. PATENT DOCUMENTS

| | | |
|---|---|---|
| 4,933,971 A | 6/1990 | Bestock et al. |
| 5,764,766 A | 6/1998 | Spratte |
| 7,657,033 B2 * | 2/2010 | Fiske ................... H04L 9/0822 380/259 |
| 7,818,586 B2 | 10/2010 | Witt et al. |
| 9,992,020 B1 | 6/2018 | Garagnon et al. |
| 10,348,502 B2 | 7/2019 | Bowman et al. |
| 10,574,454 B1 | 2/2020 | Bernat et al. |
| 2004/0264702 A1 * | 12/2004 | Eastlake, III ........... H04L 9/302 380/277 |
| 2013/0290334 A1 * | 10/2013 | Kapoor ................... G06F 3/067 707/E17.089 |
| 2014/0164790 A1 * | 6/2014 | Dodgson ................ G06Q 10/10 713/193 |
| 2017/0019253 A1 * | 1/2017 | Baptist .................... H04L 67/10 |
| 2017/0118016 A1 * | 4/2017 | Shibutani .............. H04L 9/0631 |

* cited by examiner

*Primary Examiner* — Jung W Kim
*Assistant Examiner* — Alan Lingqian Kong
(74) *Attorney, Agent, or Firm* — Kanika Radhakrishnan; Evergreen Valley Law Group

(57) ABSTRACT

Methods, systems and computer program products for improving performance of a cryptographic algorithm are described. First, data to be encrypted/decrypted is provided as input to the system. A primary key, or multiple keys (in case of asymmetric cryptography), is generated for the encryption/decryption process. The primary key consists of metadata as well as key blocks containing secondary keys. The metadata contains information explaining how the data will be handled from algorithmic structure to the base cryptographic scheme to be used. Further, the data is split and processed via relevant portions of the key blocks. Finally, the completed encrypted/decrypted data segments are combined in order to complete the process. The used process ensures higher performance as well as higher algorithmic entropy than comparable methods in literature or on the market.

15 Claims, 9 Drawing Sheets

CRYPTOGRAPHIC SYSTEMS WITH VARIABLE LAYOUT CRYPTOGRAPHY

TECHNICAL FIELD

Embodiments of the disclosure relate generally to a field of cryptography and, more particularly to, methods, systems and computer program products for improving performance and algorithmic entropy of a cryptographic system.

BACKGROUND

Currently, personal digital assistants and computers are used to store confidential information, such as banking details, passwords, personal messages, etc. The storage and transmission of confidential information have led to the development of various cryptographic algorithms that can be used to encrypt/decrypt such kind of data. The cryptographic algorithms help in protecting data from theft and alteration and also help in maintaining data integrity and confidentiality.

As we know, commonly used cryptographic algorithms depend on a key (or multiple in certain scenarios) for their security. The key is used in the encryption/decryption process. The cryptographic algorithm used for encryption itself may be widely known, but the encrypted data will remain secure as long as the integrity of the key is not compromised. With advancements in technology, keys of certain lengths that were originally secure are now incredibly easy to crack. Accordingly, to make the encryption process more secure, conventional methods of encryption must generate key sizes of increasingly larger bit lengths as encryption strength is directly proportional to the size of the key used to perform encryption. With the increase in the size of the key, the computation time for the user increases due to the increasing complexity that the encryption/decryption process entails. An increase of key length by a single bit can lead to a 16 times increase in computational complexity.

In light of the above discussion, there is a need for methods, systems and computer program products that improve the performance efficiency of utilizing cryptographic algorithms while also maintaining their security.

SUMMARY

Various embodiments of the present disclosure provide methods, systems and computer program product for improving performance of a cryptographic system.

In an embodiment, a method is disclosed. The method includes receiving data to be encrypted. The method includes generating a primary encryption key for encrypting the data. The primary encryption key includes metadata and one or more key-blocks. The metadata includes information about structure of an underlying algorithm and a cryptographic algorithm of choice to be used for encryption. The one or more key-blocks include one or more keys. The method includes splitting the received data into one or more portions based on the information stored in the metadata of the primary encryption key. The method includes processing each portion of the one or more portions with a key of the one or more keys within the key-blocks using serial processing. The method further includes combining processed one or more portions to form encrypted data.

In another embodiment, a system is disclosed. The system includes one or more volatile and non-volatile memories to store instructions and a processor to execute the stored instructions in said memories and thereby causing the system to receive data to be encrypted. The system is further configured to generate a primary encryption key for encrypting the data. The primary encryption key includes metadata and one or more key-blocks. The metadata includes information about structure of an underlying algorithm and a cryptographic algorithm of choice to be used for encryption. The one or more key-blocks include one or more keys. The system is further configured to split the received data into one or more portions based on the information stored in the metadata of the primary encryption key. The system is further configured to process each portion of the one or more portions with a key of the one or more keys using serial processing. The system is further configured to combine processed one or more portions to form encrypted data.

In yet another embodiment, a computer program product is disclosed. The computer program product includes a non-transitory computer-readable storage medium. The computer-readable storage medium includes a set of instructions that are executed by one or more processors in an electronic device to cause the electronic device to receive data to be encrypted. The computer program product is further configured to generate a primary encryption key for encrypting the data. The primary encryption key includes metadata and one or more key-blocks. The metadata includes information about structure of the underlying algorithm and a cryptographic algorithm of choice to be used for encryption. The one or more key-blocks include one or more keys. The computer program product is further configured to split the received data into one or more portions based on the information stored in the metadata of the primary encryption key. The computer program product is further configured to process each portion of the one or more portions with a key of the one or more keys using serial processing. The computer program product is further configured to combine processed one or more portions to form encrypted data.

In further yet another embodiment, a variable layout cryptography system is disclosed. The variable layout cryptography system includes an input-output module, an encryption-decryption module, a processing module and a storage module. The input-output module is configured to receive data from input devices and to provide data to output devices. The UI module is in communication with the database. The encryption-decryption module is in communication with the input-output module. The encryption-decryption module is configured to perform encryption and decryption on the received data using a cryptographic algorithm. The processing module is in communication with the input-output module and the encryption-decryption module. The processing module is configured to perform pre-processing and post-processing on the received data. The storage module is in communication with the input-output module and the encryption-decryption module. The storage module is configured to store the primary encryption and decryption keys (for symmetric encryption there is one whereas for asymmetric there are two), and one or more secondary keys and to store data associated with one or more cryptographic algorithms.

BRIEF DESCRIPTION OF THE FIGURES

For a more complete understanding of example embodiments of the present technology, reference is now made to the following descriptions taken in connection with the accompanying drawings in which.

Figure 1:
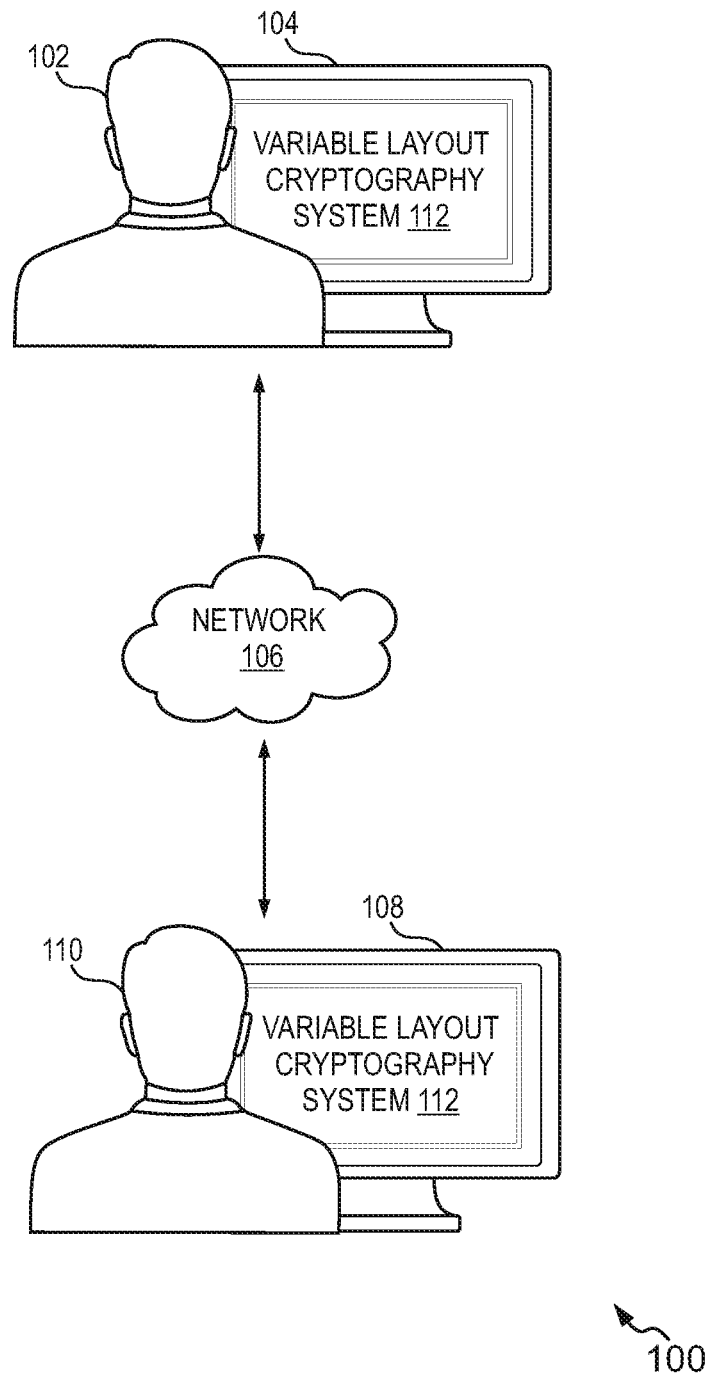
FIG. 1 is an illustration of an environment, where at least some example embodiments can be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, systems and computer program products for improving the performance of a cryptographic system.

A variable layout cryptography system is provided for improving the performance of a cryptographic algorithm even when larger bit length keys are being used for encryption/decryption. The variable layout cryptography system generates a primary encryption key and a primary decryption key for performing data encryption and decryption, respectively. The primary encryption key/primary decryption key includes two segments i.e. a metadata and a key block. The metadata includes information about structure of a cryptographic algorithm that will be used to perform the encryption/decryption. The information includes one or more of: number of parallel nodes, number of series nodes and private key checksums (in case of asymmetric cryptographic algorithms) The key block includes one or more keys that may be used for performing the encryption/decryption. By splitting the primary encryption key/primary decryption key into one or more secondary keys stored in the key block, computational complexity is linearly increased as opposed to exponentially as we are effectively increasing the number of steps rather than making each step harder.

The variable layout cryptography system may split the received data into one or more portions based on the information stored in the metadata of the primary encryption key/primary decryption key i.e. the data is split into one or more portions based on the number of parallel nodes defined in the metadata. The splitting of the data into one or more portions increases encryption and decryption speed as each segment can be handled in parallel. This is a boon, especially now as processor vendors start to increase performance by focusing more on the number of cores rather than each core's clock speed. Further, the variable layout cryptography system may encrypt/decrypt each bit of each portion of the one or more portions with a key of the one or more keys that are included in the key blocks.

The variable layout cryptography system further combines the encrypted/decrypted one or more portions to form encrypted/decrypted data.

FIG. 1 is an illustration of an environment 100 related to at least some example embodiments of the present disclosure. The environment 100 includes, but is not limited to, a wireless communication network (e.g., a network 106) that connects a user 102 with a user 110. The users 102 and 110 are depicted to be associated with electronic devices 104 and 108 (hereinafter referred to as 'user device 104 and user device 108', respectively). It should be noted that two users are shown for the sake of simplicity; there can be any number of users, even a single user who is wishing to protect their own data.

The user devices 104 and 108 are equipped with a variable layout cryptography system 112 that facilitates encryption and decryption of data using a cryptographic algorithm. The user devices 104 and 108 may also include some additional components, such as a memory device, processing devices, input/output devices etc. In an embodiment, the user devices 104 and 108 may be any communication devices having hardware components for enabling functioning of the variable layout cryptography system 112 that is included in the user devices 104 and 108. The user devices 104 and 108 may be capable of being connected to a wireless communication network (such as the network 106). Examples of the user devices 104 and 108 include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like.

In at least one example embodiment, the variable layout cryptography system 112 can be implemented internally of an electronic device, such as the user devices 104 and 108, or a memory array structure, among other systems and devices where communication can occur over the network 106. The communication can take place in the form of an internal bus or wiring between components (discussed in detail with reference to FIG. 2) that implement encoding, decoding and other cryptographic functionality of the variable layout cryptography system 112.

The user 102 may use the variable layout cryptography system 112 provided on the user device 104 for encrypting data that the user 102 wants to send to the user 110. The user 102 may provide the data to be encrypted to the variable layout cryptography system 112 using an input and/or output (I/O) device. Examples of the I/O devices may include input devices, such as a keyboard, mouse, scanner, microphone etc., and the output devices, such as a printer, display, etc. The I/O devices may further include devices that communicate inputs and outputs, for instance, a modulator/demodulator (for accessing another device, system, or network), a radio frequency (RF) or other transceivers, a telephonic interface, a bridge, a router, etc.

In an embodiment, the variable layout cryptography system 112, upon receiving the data to be encrypted, may selectively function to encrypt the received data. The variable layout cryptography system 112 may first generate a primary encryption key for encrypting the data. The primary encryption key may include metadata and one or more key-blocks. The metadata is a block provided in the primary key that includes information about structure of a cryptographic algorithm, such as number of series nodes, number of parallel nodes and private key checksums (in case the cryptographic algorithm is an asymmetric cryptographic algorithm) and the cryptographic algorithm that may be used by the variable layout cryptography system 112 for data encryption. It should be noted that the cryptographic algorithm can be any known symmetric and asymmetric cryptographic algorithm or combination of them, such as Data Encryption Standard (DES) algorithm, Rivest-Shamir-Adleman (RSA) encryption algorithm, Blowfish, Twofish, Advanced Encryption Standard (AES) etc. The symmetric cryptographic algorithm uses symmetric cryptography in which a single key is used for both encryption and decryption of data. The asymmetric cryptographic algorithm uses asymmetric cryptography in which a public-private key pair is used for encryption and decryption of the data. The data that is encrypted using a public key can only be decrypted using a specific private key in the key pair, while also, the data encrypted using a private key can be only decrypted using a specific public key in the key pair. The one or more key-blocks include one or more keys that may be used for data encryption. The variable layout cryptography system 112 may then split the received data into one or more equal portions based on the parallel nodes defined in the metadata. In case of unequal size in one or more portions, the variable layout cryptography system 112 may add a zero to an unequal size portion of the one or more portions to make all portions of equal size. The variable layout cryptography system 112 may also perform a base manipulation of the data for differentiating added zeros from already existing zeros. Further, the variable layout cryptography system 112 encrypts each portion of the one or more portions with a key of the one or more keys using both parallel and series processing. The encrypted portions are then combined in a serial order to form the encrypted data.

Once the data encryption is done, the variable layout cryptography system 112 may generate and send one or more secondary keys to the user device 108 associated with the user 110 along with the encrypted data using the network 106. Examples of the network 106 include stand-alone or a combination of a local area network (LAN), a wide area network (WAN), wireless, wired, any currently existing or to be developed network that can be used for communication. More specifically, an example of the network 106 can be the Internet which may be a combination of a plurality of networks. The encrypted data and the one or more secondary keys are transferred over the network 106 according to a number of protocols, including HTTP and/or FTP, among others. The one or more secondary keys may be combined into one or more primary decryption keys by the user device 108 to perform inverse transformation/decryption of the encrypted data to reproduce the original data. Additionally, the variable layout cryptography system 112 may perform additional operations, such as compression of the encrypted data according to syntax and semantics of a variety of coding methods (e.g., MPEG, etc.).

The variable layout cryptography system 112 provided on the user device 108 may perform the decryption of the encrypted data sent by the user 102 using the user device 104. The variable layout cryptography system 112 may first generate a primary decryption key for decrypting the received encrypted data using the one or more secondary keys sent by the user device 104 along with the encrypted data. In an embodiment, a node structure of the primary decryption key generated for decrypting the encrypted data is same as a node structure of the primary encryption key that is used for encrypting the data. In another embodiment, a node structure of the primary decryption key generated for decrypting the encrypted data is different from a node structure of the primary encryption key that is used for encrypting the data. The node structure of the primary decryption key generated for decrypting the encrypted data is different from the node structure of the primary encryption key that is used for encrypting the data generally if the cryptographic algorithm is the asymmetric cryptographic algorithm. This structural difference is there to ensure that malicious actors cannot gleam any important information about a hidden key from the public key, as it is generally the case. In case of asymmetric cryptographic algorithms, the primary decryption key generated for decrypting the encrypted data is one of a private key or a public key from a private-public key pair. The primary decryption key may include metadata and one or more key-blocks. The one or more key-blocks include one or more secondary keys that may be used for data decryption. The variable layout cryptography system 112 may then split the received encrypted data into one or more portions based on the number of parallel nodes defined in the metadata of the primary decryption key generated for decrypting the encrypted data. In case of unequal size one or more portions, the variable layout cryptography system 112 may add a zero to an unequal size portion of the one or more portions to make equal size one or more portions. The variable layout cryptography system 112 may also perform a base manipulation of the data for differentiating added zeros from already existing zeros. Further, the variable layout cryptography system 112 may decrypt each portion of the one or more portions with a secondary key of the one or more secondary keys using the same cryptographic algorithm that is used at the time of data encryption. The decrypted portions are then combined in a serial order to form the decrypted data. The decrypted data may then be displayed to the user 110 on his/her user device 108.

In some example embodiments, the variable layout cryptography system 112 can be implemented in software as an executable program and can be executed by a special or general-purpose digital computer, such as the user devices 104 and 108.

In some other example embodiment, the instructions (or the executable code) configuring the variable layout cryptography system 112 may be stored in a memory of the user devices 104 and 108 and the instructions are executed by a processor (for example, a single-core or a multi-core processor) included within user devices 104 and 108. Accordingly, even though the various functionalities for improving performance of a cryptographic algorithm are explained with reference to or being performed by the variable layout cryptography system 112, it is understood that the processor in conjunction with the code in the memory is configured to execute the various tasks as enabled by the instructions of the variable layout cryptography system 112.

The various components of the variable layout cryptography system 112 are further explained with reference to FIG. 2.

Figure 2:
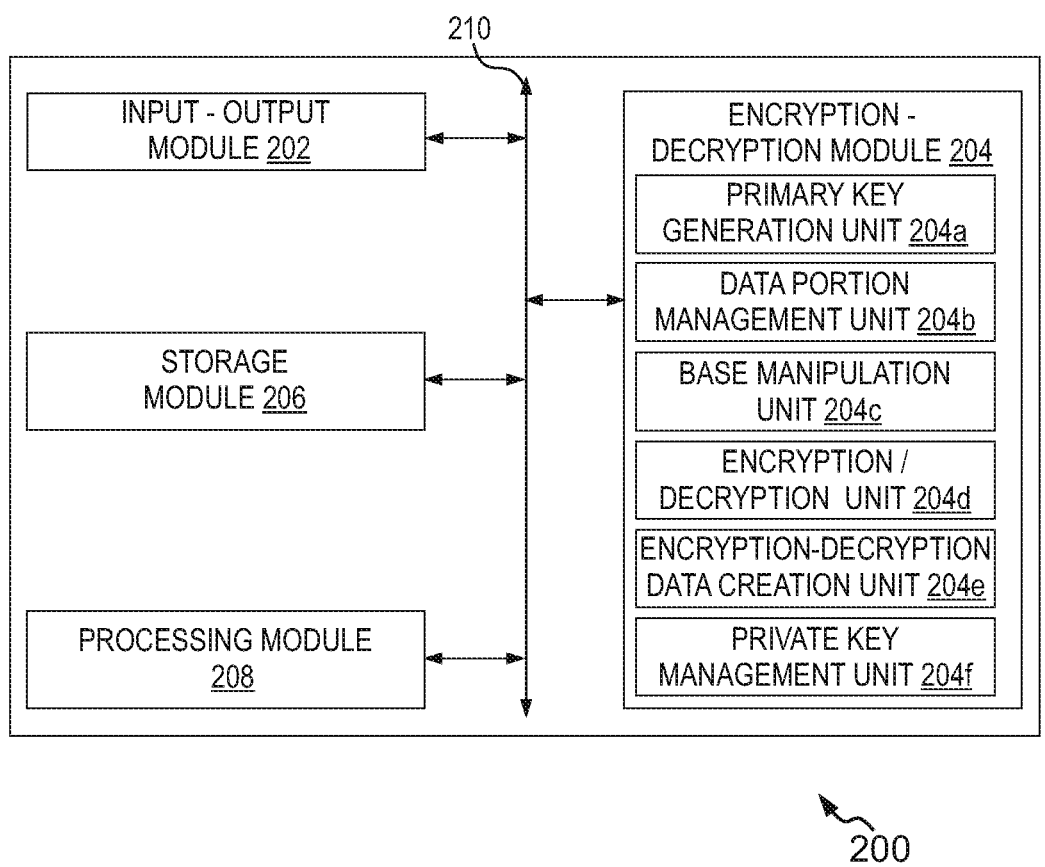
FIG. 2 is a block diagram of a variable layout cryptographic system, in accordance with an example embodiment.

FIG. 2 is a block diagram of a variable layout cryptography system 200 for improving performance of a cryptographic algorithm, in accordance with an example embodiment. The variable layout cryptography system 200 is configured to perform encryption/decryption of data using a cryptographic algorithm. The data that can be represented by bits can be encrypted/decrypted using the variable layout cryptography system 200. In an embodiment, the variable layout cryptography system 200 includes an input-output module 202, an encryption-decryption module 204, a storage module 206, a processing module 208 and a centralized circuit system 210.

The input-output module 202 is configured to receive data to be encrypted/decrypted from input devices. Examples of the input devices may include, but are not limited to, a keyboard, a mouse, a joystick, a keypad, a touch screen, soft keys, a floppy disk, a pen drive, a hard drive and the like. The input-output module 202 is also configured to provide encrypted/decrypted data to output devices. Examples of the output devices may include, but are not limited to, a display such as a light emitting diode (LED) display, a thin-film transistor (TFT) display, a liquid crystal display, an active-matrix organic light-emitting diode (AMOLED) display, and the like.

The encryption-decryption module 204 is in communication with the input-output module 202. The encryption-decryption module 204 is configured to perform encryption on the received data using a cryptographic algorithm. The encryption-decryption module 204 is also configured to perform decryption of the encrypted data using the same cryptographic algorithm. The encryption-decryption module 204 includes a primary key generation unit 204a, data portion management unit 204b, a base manipulation unit 204c, an encryption-decryption unit 204d, an encryption-decryption data creation unit 204e and a private key management unit 204f.

The primary key generation unit 204a is configured to generate a primary encryption key for data encryption and a primary decryption key for data decryption. The primary key includes metadata and one or more key-blocks. In an embodiment, the metadata includes information about structure of the cryptographic algorithm and layout of a design that will be used for encryption/decryption. The metadata includes one or more of the following: number of series nodes, number of parallel nodes and private key checksums. The one or more key-blocks include one or more keys that may be used while performing encryption and decryption of the data. The primary key generation unit 204a is also configured to generate a private key for decryption of the encrypted data if the encryption algorithm that is used for the data encryption is an asymmetric cryptographic algorithm. The private key also includes metadata and one or more key-blocks similar to the primary decryption key.

The data portion management unit 204b is in communication with the primary key generation unit 204a. The data portion management unit 204b is configured to split the received data into one or more portions based on the information (number of series nodes and number of parallel nodes) stored in the primary encryption key and the primary decryption key generated by the primary key generation unit 204a. In an embodiment, the one or more portions are equal sized portions. In another embodiment, the one or more portions are unequal sized portions. The splitting of the data into one or more portions may help in parallel and serial processing of the data that further helps in reducing time required for data processing.

The base manipulation unit 204c is in communication with the data portion management unit 204b. The base manipulation unit 204c is configured to add a zero to an unequal size portion of the one or more portions to make all portions of equal size. For example, we are trying to encrypt the binary data '11111'. The binary data has an odd number of bits, so a data split may create two portions such as "111" and "11". Since, a second portion is of smaller size than the first portion, a zero may be added to the second portion like '011' to make both the portions of equal size. Note that while "011" has an additional bit when compared to "11", the values are identical. It should be noted that the zero is only added in case of unbalanced data splits. The base manipulation unit 204c is also configured to perform base manipulation of the received data i.e. if the data is of base 2, the data is moved to base 3; if it is of base 16, then it is moved to base 17, and so forth. Further, the base manipulation unit 204c is configured to increase numerical value of the data by one. So, zero becomes one, one becomes two and so on. This way only appended zeros are left as zero, which helps in distinguishing between a zero that needs to be removed later on, and a zero that needs to be kept for processing. The base manipulation and the increase in numerical value are performed to ensure that added zeros are differentiated from already existing zeros. It should be noted that at the time of data decryption, the numbers are reverted to their original form.

The encryption-decryption unit 204d is in communication with the data portion management unit 204b and the base manipulation unit 204c. The encryption-decryption unit 204*d* is configured to encrypt each portion of the one or more portions to prepare encrypted portions using the one or more keys provided in the one or more key-blocks if the data is received for encryption. The encryption-decryption unit 204*d* is also configured to decrypt each portion of the one or more portions to prepare decrypted portions if the encrypted data is received for decryption.

The encryption-decryption data creation unit 204*e* is in communication with the encryption-decryption unit 204*d*. The encryption-decryption data creation unit 204*e* is configured to combine the encrypted one or more portions to form encrypted data. The encryption-decryption data creation unit 204*e* is also configured to combine the decrypted one or more portions to form decrypted data.

The private key management unit 204*f* is in communication with the primary key generation unit 204*a* and the data portion management unit 204*b*. The private key management unit 204*f* is configured to perform validation of a private key using private key checksums, such as private key length defined in the information contained in the metadata of the public key if the cryptographic algorithm that is being used for the encryption is the asymmetric cryptographic algorithm. In asymmetric cryptographic, a public-private key pair is used for encryption and decryption of the data. A public key, that can be made available to anyone, is used for encrypting the data and a private key, that is secret to a person who is authorized to receive data, is used for decrypting the data. It is to be noted that in some embodiments, the purpose of the private and public keys can be reversed such as is needed for cryptographic signing; all that is for certain is one is public and the other is private. The verification of the private key is performed before splitting the received data into one or more portions. So, once the private key is verified by the private key management unit 204*f*, the data is split into one or more portions based on a number of parallel nodes defined in the information contained in the metadata of the private key.

The storage module 206 is in communication with the input-output module 202 and the encryption-decryption module 204. The storage module 206 is configured to store primary encryption and primary decryption keys, private keys and other keys that are used for performing encryption and decryption of the data. The storage module 206 is configured to store data associated with one or more cryptographic algorithms that can be used for encryption and decryption of the data.

The processing module 208 is in communication with the input-output module 202, the encryption-decryption module 204 and the storage module 206. The processing module 208 is configured to perform processing, pre-processing and post-processing of the received data. While processing, the processing module 208 is configured to coordinate with the input-output module 202, encryption-decryption module 204 and storage module 206 of the variable layout cryptography system 200 for operation of the various components of the variable layout cryptography system 200.

The input-output module 202, an encryption-decryption module 204, a storage module 206 and the processing module 208 may be configured to communicate with each other via or through the centralized circuit system 210. The centralized circuit system 210 may be various devices configured to, among other things, provide or enable communication between the modules (202-208) of the variable layout cryptography system 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media. In some embodiments, the centralized circuit system 210 may include appropriate storage interfaces to facilitate communication among the modules (202-208). Some examples of the storage interface may include, for example, an Advanced Technology Attachment (ATA) adapter, a Serial ATA (SATA) adapter, a Small Computer System Interface (SCSI) adapter, a RAID controller, a SAN adapter or a network adapter.

In an embodiment, the variable layout cryptography system 200 can be a source program, executable program (object code), script, and/or any other entity including a set of instructions to be performed. In case of the source program, the program may be required to be translated via a compiler, an assembler, an interpreter, or the like, which may or may not be included within a memory of an electronic device (e.g., the user devices 104 and 108), so the program may be operated in connection with an operating system of the electronic device. Further, the variable layout cryptography system 200 can be written as an object oriented programming language that has classes of data and methods, or as a procedure programming language that has routines, subroutines, and/or functions, such as C++, Java, Python, etc.

In at least one example embodiment, if the variable layout cryptography system 200 is implemented in software, one or more modules of the variable layout cryptography system 200 can be stored on any computer readable medium for use by, or in connection with, any computer related system or method. In the context of a current document, a computer readable medium is an electronic, magnetic, optical, or any other physical device or means that can store, communicate, propagate or transport a computer program for use by, or in connection with, a computer related system or method. The one or more modules of the variable layout cryptography system 200 can be embodied in any computer-readable medium for use by, or in connection with, an instruction execution system, apparatus, or device, such as a computer-based system, processor-containing system, or other system that can fetch the instructions from the instruction execution system, apparatus, or device and execute the instructions. Examples of the computer readable medium include, but not limited to, an electronic, magnetic, optical, electromagnetic, infrared, or semiconductor system, apparatus, device, or a propagation medium. More specific examples of the computer-readable medium can include the following: an electrical connection having one or more wires, a portable computer disk, a random access memory (RAM), a read-only memory (ROM), an erasable programmable read-only memory (EPROM, EEPROM, or Flash memory), an optical fiber and a portable compact disc read-only memory (CDROM). It should be noted that the computer-readable medium can even be a paper or another suitable medium upon which the program is printed, as the program can be electronically captured, via, for instance, optical scanning of the paper or other medium. It can then be compiled, interpreted or otherwise processed in a suitable manner, and finally stored in a computer memory.

In some embodiments, where the variable layout cryptography system 200 is implemented in a hardware, one or more modules of the variable layout cryptography system 200 can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The ASIC can be a custom made ASIC or a commercially available ASIC.

Figure 3:
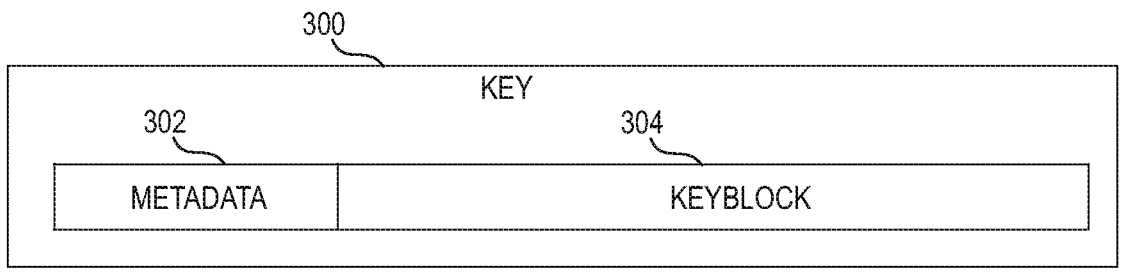
FIG. 3 is an example representation of a primary key layout, in accordance with an example embodiment.

FIG. 3 is an example representation of a primary key layout, in accordance with an example embodiment. The variable layout cryptography system 200 generates a primary key 300 for performing encryption and decryption of the data. In an embodiment, the primary key is the primary encryption key. In another embodiment, the primary key is the primary decryption key. In yet another embodiment, the primary key 300 is a private key. In yet further another embodiment, the primary key 300 is different from the private key.

As shown in FIG. 3, the primary key 300 includes a metadata 302 and a key block 304. The metadata 302 includes information regarding the structure of a cryptography algorithm, such as number of series nodes, number of parallel nodes and private key checksums (in case of asymmetric cryptographic algorithm) that may be used by the variable layout cryptography system 200. For example, suppose the metadata is 8 bits long, then first 4 bits may correspond to number of series nodes and last 4 bits may correspond to number of parallel nodes. So if our metadata is 00110010, as 0011 is binary for 3 and 0010 is binary for 2, we may have 3 series nodes and 2 parallel nodes that means the data needs to be split into 2 portions (2 parallel nodes). Each portion may undergo encryption/decryption 3 times (once for each series node) before merging the portions together. The metadata 302 may also include information about the cryptographic algorithm that is to be used such as RSA, DH, etc., for performing encryption/decryption of the data. A maximum variation of the private key layout that can occur is 2 to the power of the metadata length.

The key block 304 includes a series of keys that are organized in an order of implementation. The keys are split into equal parts based on the number of parallel nodes defined in the metadata 302. The total number of keys in each key block 304 is determined by the number of parallel nodes times the number of series nodes used for the performing cryptography i.e.

Number of key-block=Number of parallel nodes*Number of series nodes.

In an embodiment, each data portion is processed for performing encryption/decryption operation by each node. If the number of parallel nodes requested by the metadata exceeds the number of parallel processors that are available in an electronic device (e.g., the electronic device 104), then the remaining nodes wait until a parallel processor is available for operation.

Figure 4:
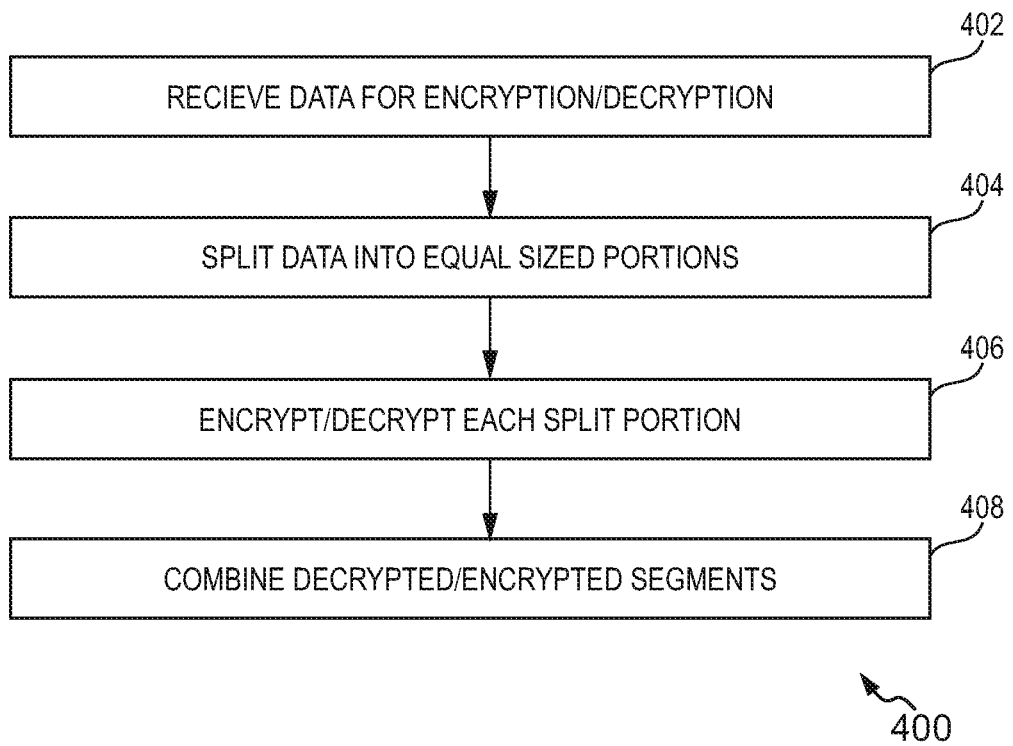
FIG. 4 is a flow diagram for performing encryption/decryption using a cryptographic algorithm in case of an equal size key length, in accordance with an example embodiment.

FIG. 4 is a flow diagram 400 for performing encryption/decryption using a cryptographic algorithm in case of an equal size key length, in accordance with an example embodiment. The key length is the number of bits in a key used by cryptographic algorithm. The operations of the flow diagram 400 may be carried out by the variable layout cryptography system 200 included in the user devices 104 and 108. The sequence of operations of the flow diagram 400 may not be necessarily executed in the same order as they are presented. Further, one or more operations may be grouped together and performed in form of a single step, or one operation may have several sub-steps that may be performed in parallel or in sequential manner.

At operation 402, data to be encrypted/decrypted is received by the variable layout cryptography system 200. A user (e.g., the user 102) may provide the data for encryption to the variable layout cryptography system 200 using an electronic device (e.g., the user device 104).

At operation 404, upon receiving the data, the variable layout cryptography system 200 may split the data into equal sized one or more portions. The number of portions to be performed depends on the number of parallel nodes defined in the metadata of the primary key (e.g., the primary key 300) prepared for performing encryption/decryption of the data.

At operation 406, the equal sized one or more portions are encrypted/decrypted with one or more keys using serial and parallel processing to form encrypted/decrypted one or more portions. The one or more keys that may be used for performing encryption/decryption are included in the key blocks of the primary key.

At operation 408, the encrypted/decrypted one or more portions are combined to result in encrypted/decrypted data based on an operation performed. It should be noted that the encrypted/decrypted portions are combined in a serial manner.

Figure 5:
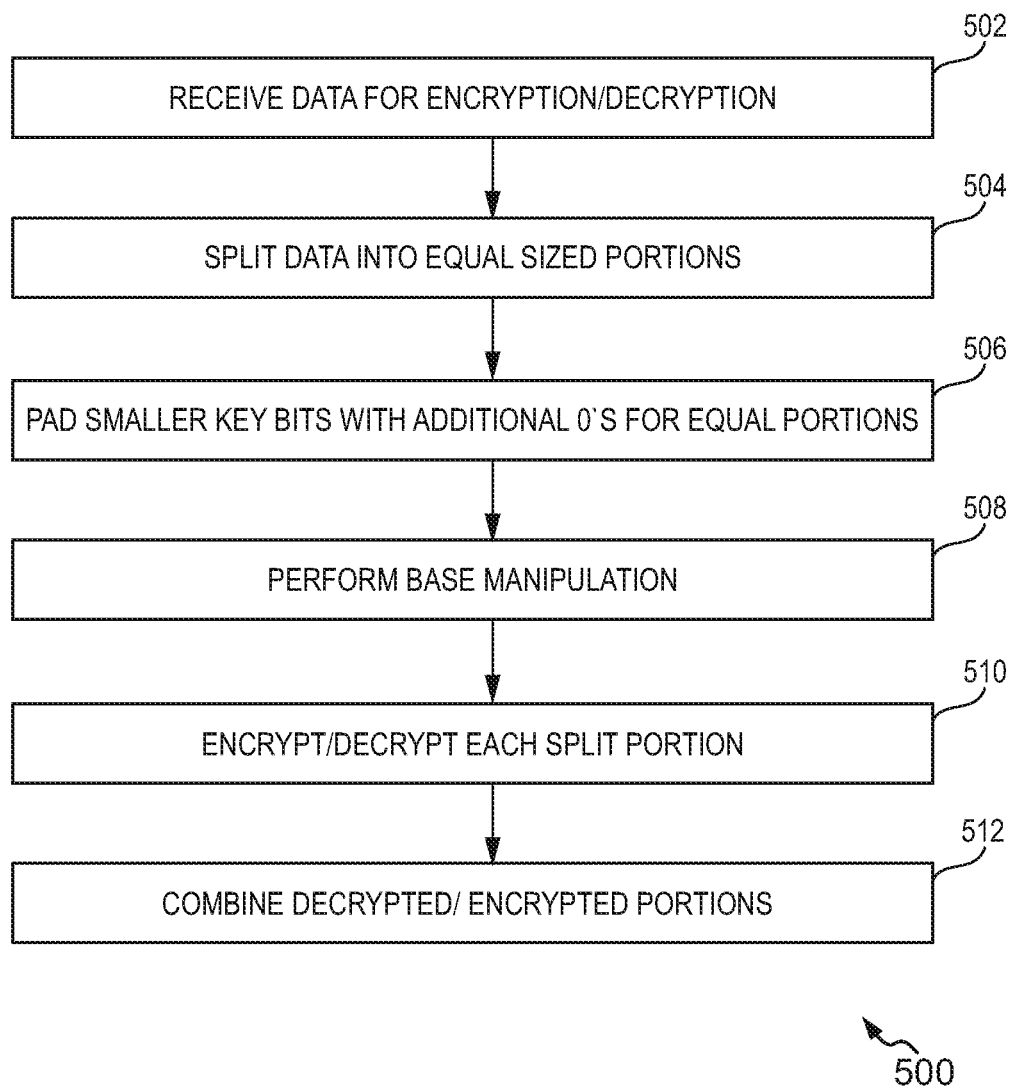
FIG. 5 is a flow diagram for performing encryption/decryption using the cryptographic algorithm in case of an unequal size key length, in accordance with another example embodiment.

FIG. 5 is a flow diagram 500 for performing encryption/decryption using a cryptographic algorithm in case of an unequal sized key length, in accordance with an example embodiment. The operations of the flow diagram 500 may be carried out by the variable layout cryptography system 200 included in the user devices 104 and 108. The sequence of operations of the flow diagram 500 may not be necessarily executed in the same order as they are presented. Further, one or more operations may be grouped together and performed in form of a single step, or one operation may have several sub-steps that may be performed in parallel or in sequential manner.

At operation 502, data to be encrypted/decrypted is received by the variable layout cryptography system 200. A user (e.g., the user 102) may provide the data for encryption to the variable layout cryptography system 200 using an electronic device (e.g., the user device 104).

At operation 504, upon receiving the data, the variable layout cryptography system 200 may split the data into equal sized one or more portions. A number of portions to be performed depend on a number of parallel nodes defined in a metadata of a primary key (e.g., the primary key 300) prepared for performing encryption/decryption of the data.

At operation 506, the variable layout cryptography system 200 pads any smaller key bit length with '0''s in such a manner that the data is split in equal portions. A zero is added to an unequal size portion of the one or more portions to make equal size one or more portions.

At operation 508, a base manipulation is performed on the received data to retain precision of the data. The variable layout cryptography system 200 may perform base manipulation of the received data i.e. if it is the data of base 2, the data is moved to base 3; if it is of base 16, then it is moved to base 17, and so forth.

At operation 510, the one or more portions are encrypted/decrypted with one or more keys using serial and parallel processing to form encrypted/decrypted one or more portions. The one or more keys that may be used for performing encryption/decryption are included in the key blocks of the primary key. In case of decryption, if the base manipulation and the padding are already performed on the data, the numbers are reverted back to their original form at the end of decryption.

At operation 512, the encrypted/decrypted one or more portions are combined to result in encrypted/decrypted data based on an operation performed. It should be noted that the encrypted/decrypted portions are combined in a serial manner.

Figure 6:
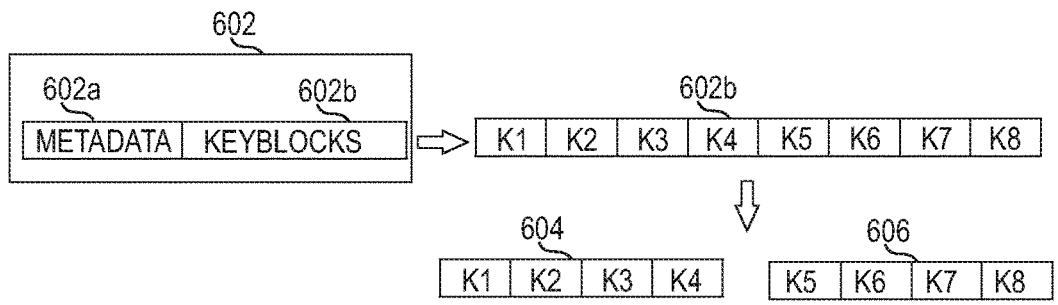
FIG. 6 is an example representation of a key structure of a primary key, in accordance with an example embodiment.

FIG. 6 is an example representation 600 of a key structure of a primary key 602, in accordance with an example embodiment. In an embodiment, the primary key 602 is a primary encryption key in case the encryption is to be performed using the primary key. In another embodiment, the primary key 602 is a primary decryption key in case the decryption is to be performed using the primary key. The key structure includes details of the parallel and the series nodes along with details of the cryptographic algorithm that may be used for performing cryptographic operations. The key structure also includes one or more keys that may be used for processing one or more portions of the data that needs to be encrypted/decrypted.

As shown in FIG. 6, the primary key 602 includes two sections i.e. a metadata 602a and key block 602b. The key block 602b includes keys K1 to K8. The keys K1 to K8 are split based on the number of parallel and series nodes defined in the metadata 602a. The keys K1 to K8 in the key block 602b are shown to be split into two portions 604 and 606 that indicate two parallel nodes are defined in the metadata 602a. A portion 604 is shown to include keys K1 to K4 and a portion 606 is shown to include keys K5 to K8. The variable layout cryptography system 200 may use the series nodes for implementation and may process the keys in the two portions 604 and 606 in the order of their appearance i.e. K1 key in portion 604 and K5 key in portion 606 are processed first, then K2 key in portion 604 and K6 key in portion 606 and so on.

Figure 7:
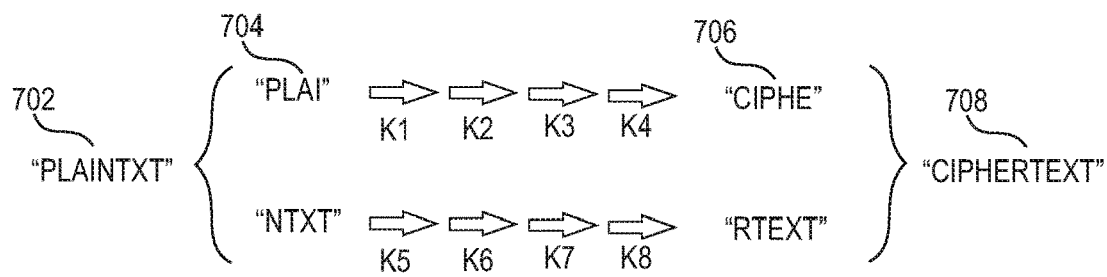
FIG. 7 is an example flow diagram for performing encryption using the variable layout cryptography system, in accordance with an example embodiment.

FIG. 7 is an example flow diagram 700 for performing encryption using the variable layout cryptography system 200, in accordance with an example embodiment. The sequence of operations of the flow diagram 700 may not be necessarily executed in the same order as they are presented. Further, one or more operations may be grouped together and performed in form of a single step, or one operation may have several sub-steps that may be performed in parallel or in sequential manner.

At operation 702, the variable layout cryptography system 200 receives text data 'plaintxt' that needs to be encrypted. At operation 704, the variable layout cryptography system 200 splits the received 'plaintxt' into two equal sized portions i.e. 'plai' and 'ntxt' based on the number of parallel nodes specified in the primary encryption key. In this case, 2 parallel nodes are defined in the metadata as the text data is split into two portions.

At operation 706, each portion is encrypted separately using a separate key from the one or more keys included in the key-block of the primary encryption key through serial processing, resulting in 'ciphe' and 'rtext'. The portion 'plai' is encrypted using the keys K1 to K4 to form the encrypted portion 'ciphe' and the portion 'ntxt' is encrypted using the keys K5 to K8 to form the encrypted portion 'rtext'.

At operation 708, the encrypted portions are combined together in a serial order to generate a resultant encrypted data i.e. 'ciphertext'. It should be noted that inputs and outputs for data are likely to use a standard data representation in computer science such as binary, octal, decimal, and hexadecimal. The terms 'plaintxt', 'plai', 'ntxt', 'ciphertext', 'ciphe', and 'rtext' are abstract representations of data for easy illustration of the functioning of the variable layout cryptography system 200.

Figure 8:
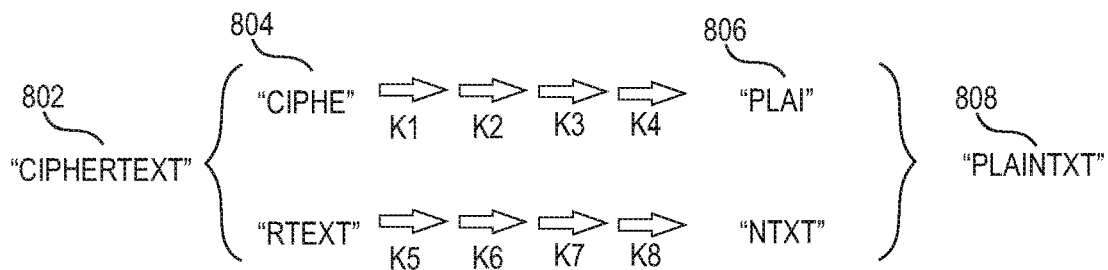
FIG. 8 is an example flow diagram for performing decryption using the variable layout cryptography system, in accordance with an example embodiment.

FIG. 8 is an example flow diagram 800 for performing decryption using the variable layout cryptography system 200, in accordance with an example embodiment. The sequence of operations of the flow diagram 800 may not be necessarily executed in the same order as they are presented. Further, one or more operations may be grouped together and performed in form of a single step, or one operation may have several sub-steps that may be performed in parallel or in sequential manner.

At operation 802, the variable layout cryptography system 200 receives encrypted data 'ciphertext' that needs to be decrypted. At operation 804, the variable layout cryptography system 200 splits the received 'ciphertext' into two equal sized portions i.e. 'ciphe' and 'rtext' based on the number of parallel nodes specified in the primary decryption key. In this case, 2 parallel nodes are defined in the metadata as the encrypted data is split into two portions.

At operation 806, each portion is decrypted separately using a separate key from the one or more keys included in the key-block of the primary decryption key through serial processing, resulting in 'plai' and 'ntxt'. The portion 'ciphe' is decrypted using the keys K1 to K4 to form the decrypted portion 'plai' and the portion 'rtext' is decrypted using the keys K5 to K8 to form the decrypted portion 'ntxt'.

At operation 808, the decrypted portions are combined together in a serial order to generate a resultant decrypted data i.e. 'plaintxt' for the encrypted data 'ciphertext'. It should be noted that inputs and outputs for data are likely to use a standard data representation in computer science such as binary, octal, decimal, and hexadecimal. The terms 'plaintext', 'plai', 'ntxt', 'ciphertext', 'ciphe', and 'rtext' are abstract representations of data for easy illustration of the functioning of the variable layout cryptography system 200.

Figure 9:
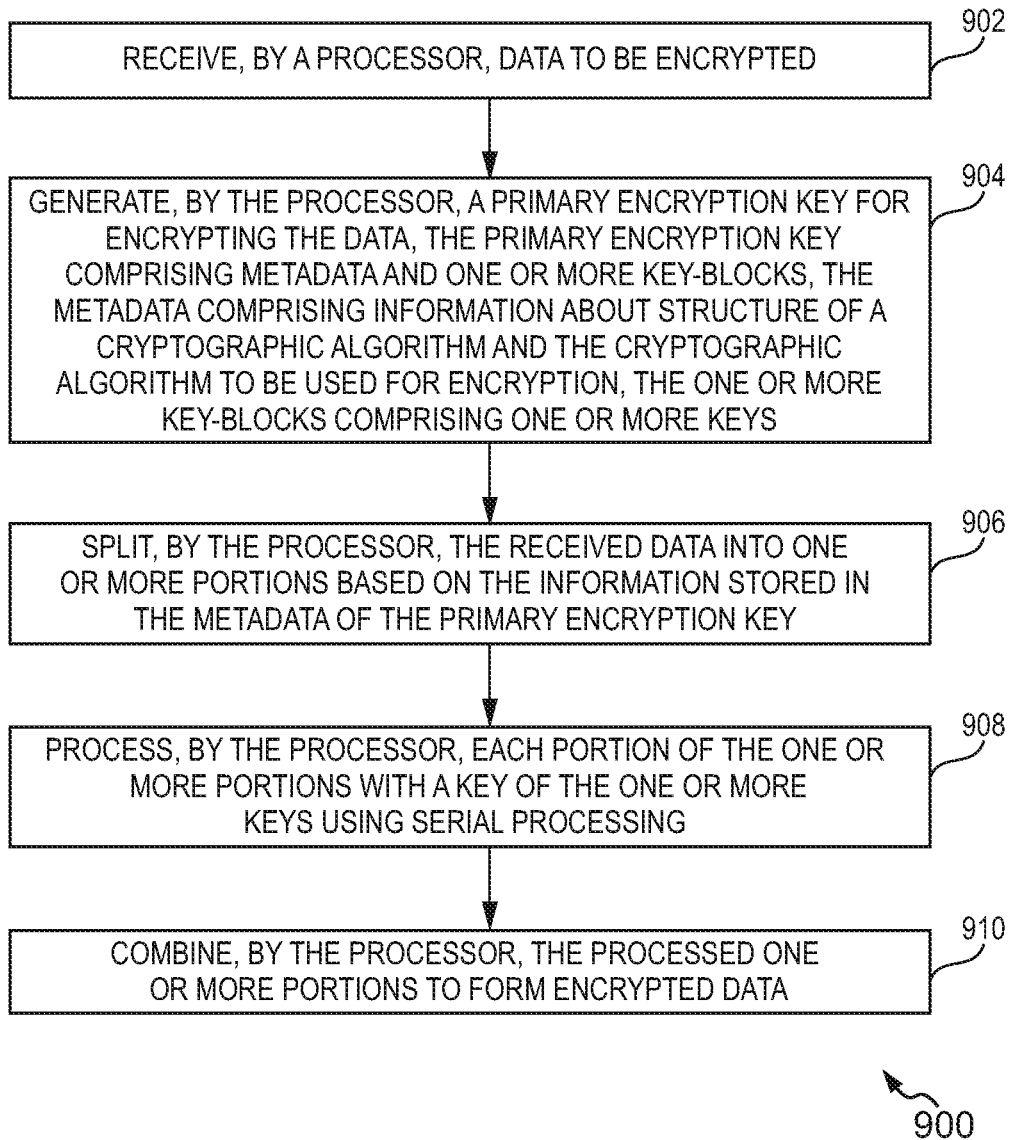
FIG. 9 is a flowchart illustrating a method for improving performance of a cryptographic algorithm, in accordance with an example embodiment.

FIG. 9 is a flowchart illustrating a method 900 for improving performance of a cryptographic algorithm, in accordance with an example embodiment. The operations of the method 900 may be carried out by the variable layout cryptography system 200 included in the user devices 104 and 108. The sequence of operations of the method 900 may not be necessarily executed in the same order as they are presented. Further, one or more operations may be grouped together and performed in form of a single step, or one operation may have several sub-steps that may be performed in parallel or in sequential manner.

At operation 902, the method 900 includes receiving, by a processor, data to be encrypted. The data that a user (e.g., the user 102) wants to encrypt is provided to the variable layout cryptography system 200 using input devices of an electronic device (e.g., the user device 104).

At operation 904, the method 900 includes generating, by the processor, a primary encryption key for encrypting the data. The primary encryption key includes metadata and one or more key-blocks. The metadata includes information about structure of a cryptographic algorithm i.e. number of parallel nodes to be created, number of series nodes to be created and, in some cases, private key checksums also. The metadata also includes information about the cryptographic algorithm to be used for encryption. For example, suppose the metadata is 12 bits long, then first 4 bits may correspond to number of series nodes, next 4 bits may correspond to number of parallel nodes and last 4 bits may correspond to the private key checksums i.e. the length of the private key if the cryptographic algorithm is an asymmetric cryptographic algorithm. So if our metadata is 001100101000, as '0011' is binary for 3, '0010' is binary for 2 and '1000' is binary for 8, we may have 3 series nodes, 2 parallel nodes and key length of the private key will be 8 bits. Basically, the metadata includes information explaining how the data will be handled from algorithmic structure to a base cryptographic scheme to be used. The one or more key-blocks include one or more keys that are used for performing encryption of the received data.

At operation 906, the method 900 includes splitting, by the processor, the received data into one or more portions based on the information stored in the metadata of the primary encryption key. The received data is split into one or more portions depending on the number of parallel nodes defined in the metadata of the primary encryption key. Once the data is split, it is determined whether the one or more portions are of equal size. Upon determining that the one or more portions are not of equal size, a zero is added to an unequal size portion of the one or more portions to make equal size one or more portions. For example, if the received binary data is '1111101', the data split may create two portions like "1111" and "101". Since, the second portion is of smaller size than the first portion, a zero may be added to the second portion like '0101' to make both the portions of equal size. Note that while "0101" has an additional bit when compared to "101", the values are identical. It should be noted that the zero is only added in case of unbalanced data splits. A base manipulation is also performed after adding zero on the received data i.e. if the received data is of base 2, then received data is moved to base 3; if the received data is of base 16, then it is moved to base 17, and so forth. The base manipulation is performed to ensure that added zeros are differentiated from already existing zeros.

At operation 908, the method 900 includes processing, by the processor, each portion of the one or more portions with a key of the one or more keys using serial processing. Each bit in each portion is encrypted using the key included in the one or more key-blocks to form the encrypted bit. The encryption always starts with first bit of each portion.

At operation 910, the method 900 includes combining, by the processor, the processed one or more portions to form encrypted data. The encrypted one or more portions are combined together in serial order i.e. first portion is placed first, then second portion, then third portion and so on. After combining the one or more portions, the encrypted data is created that can be sent over a communication network.

Figure 10A:
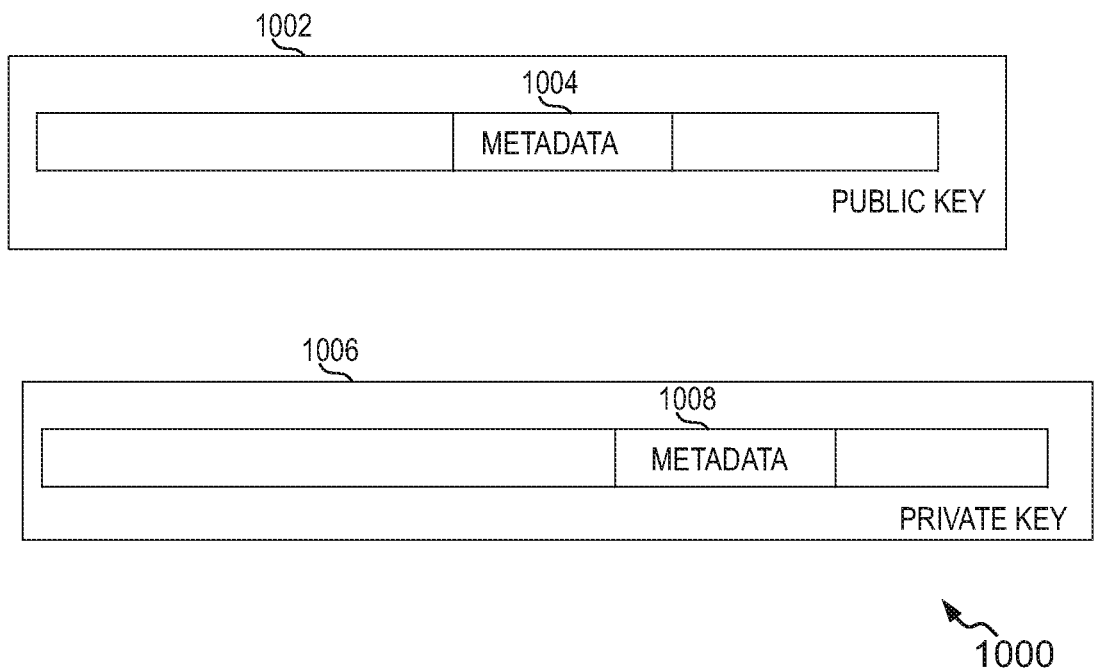
FIG. 10A is an example representation of a key structure of a public key and private key in case of an asymmetric cryptographic algorithm, in accordance with an example embodiment.

FIG. 10A is an example representation 1000 of a key structure of a public key 1002 and private key 1006 in case of an asymmetric cryptographic algorithm, in accordance with an example embodiment. In asymmetric cryptography, a private-public key pair is used to encrypt and decrypt the data. The key structure of public key 1002 cannot be same as key structure of the private key 1006 as this can lead to the determination of the key structure of the private key 1006 by analyzing the key structure of public key 1002 as key structure of public key 1002 can be easily determined because of availability of public key 1002 to one or more persons.

So, to mitigate the effect of determination, the location of the metadata is hidden in both the public key 1002 and the private key 1006. Only the end point users at both the sides i.e. sending side and receiving side might be able to determine the location of the metadata as metadata can only be analysed if a person knows the starting and ending location of the metadata. The key structure of public key 1002 is also changed from the key structure of the private key 1006 for minimizing the effect of analyzing the internal node structure that can lead to compromise of the private key 1006.

As discussed above, the start location of metadata is hidden from both end point users, so metadata can appear in the beginning of the public key 1002 and private key 1006 or it can be in the middle of the public key 1002 and the private key 1006 as shown in FIG. 10A. A location of a metadata 1004 of the public key 1002 is different from a location of a metadata 1008 of the private key 1006. So, if an attacker somehow discovers the location of the metadata and structure of the public key 1002, the learning about the metadata location of the private key 1006 can be mitigated. The two ways of mitigating metadata location are discussed in detail with reference to FIGS. 11A and 11B. It should be noted that these are merely reference examples and other various methods can be implemented as well.

In an embodiment, the start location of the metadata, or its bit offset, can be calculated at either endpoint (encryption/decryption) in a plurality of ways. An algorithm mentioned below can be used to determine the location of the metadata in the public key 1002 and the private key 1006.

Figure 10B:
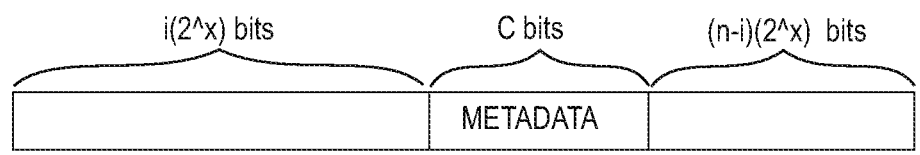
FIG. 10B is an example representation of a key structure of the primary key, in accordance with another example embodiment.

The algorithm states:

Key has a total bitlength of $n(b^x)+C$, where n is the number of key blocks, C is the metadata bitlength, and $b^x$ is a key block's size. A key block has size $b^x$ as we restrict its size space by only multiplying it by b when we need a larger key block. The block size space will include 0, b, $b^2$, $b^3$, $b^4$ and so on. C, n, and x are assumed to be known to the attacker, while b is assumed to have been determined beforehand. We will assume b=2 for this example. Observe that if the metadata is at offset location i, then there are $i*(2^x)$ bits before the metadata, and $(n-i)(2^x)$ blocks after the metadata as shown in FIG. 10B. A sliding window of size C needs to be implemented in order to check metadata candidates, sliding the window by incrementing i from 0 to n. The location of the metadata can be verified if the n is correct by checking if the metadata series nodes and parallel node number reflect n (series*parallel=n).

Figure 11A:
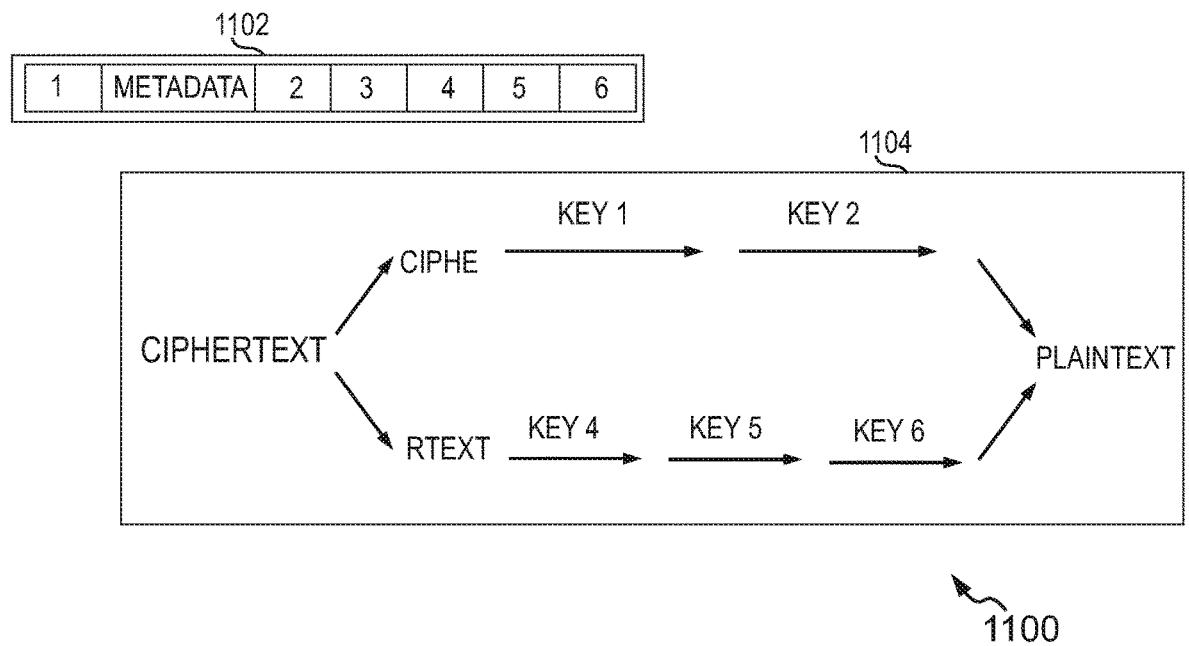
FIG. 11A is an example representation of the private key to mitigate metadata location discovery of the private key using a dummy node method, in accordance with an example embodiment.

FIG. 11A is an example representation 1100 of a private key 1102 that can be used to mitigate metadata location discovery of the private key using a dummy node method, in accordance with an example embodiment. For dummy nodes, the key length of private key should be known beforehand; either both sending and receiving parties have predetermined this beforehand, or this information can be stored within the metadata of the public key via private key checksums.

In dummy node method, private key's metadata will indicate key blocks that need to be ignored in order to obtain the correct values. This allows us to increase the number of key blocks we can have and thus increases both structural and algorithmic entropy even if the public key's structure is known.

The private key 1102 and a corresponding algorithm diagram 1104 for decryption of a message are shown in FIG. 11A. The private key 1102 that can be used to decrypt the message 'ciphertext' includes metadata after first bit. The metadata includes information about number of parallel nodes i.e. 2 parallel nodes, number of series nodes i.e. 3 series nodes, and a node to be skipped i.e. skip node 3. So, a cryptographic algorithm uses keys K1 and K2 for decrypting a first portion 'Ciphe' and keys K4, K5 and K6 for decrypting a second portion 'rtext' while leaving key K3 as K3 was the dummy node to produce a decrypted message 'Plaintext'.

Figure 11B:
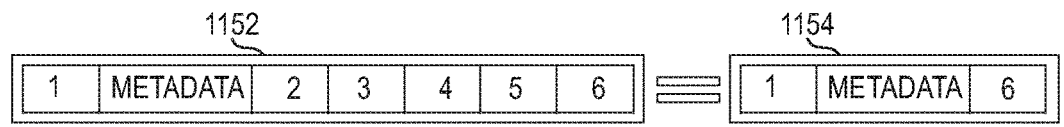
FIG. 11B is an example representation of the private key to mitigate metadata location discovery of the private key using an inverting node method, in accordance with an example embodiment.

FIG. 11B is an example representation 1150 of a private key 1152 that can be used to mitigate metadata location discovery of the private key using an inverting node method, in accordance with an example embodiment. For inverting node, the key length of private key should be known beforehand.

In inverting node method, the keys are created that invert the results for nodes that are before them. For example, if Scheme (Key2, Scheme (Key1, plaintext)) just gives us back the original plaintext (no matter its contents), then Key2 would be an inverting node. It should be noted that calculating inverting keys can be quite easy as Key1 and Key2 would normally be a public—private key pair for the specified cryptographic algorithm. The procedure that needs to be followed for creating inverting nodes is as follows. First, a public—private key pair is created for the cryptographic algorithm with key size as specified by the metadata. Then, instead of adding the generated public key to a primary public key and likewise for the private key, add both to a primary private key in series. Further, encryption or decryption via Key2 will reverse the work done by Key1 to achieve the desired effect. It should be noted that under such implementations certain portions to be processed in parallel and can have more keys in its respective key block that the other portions that needs to be processed in parallel within the key. For such uneven parallel processing splits, the private key metadata will contain information needed to determine the positions of splits which will greatly reduce the predictability of the private key layout, and thus the potential entropy of the algorithm will be dramatically increased.

As shown in FIG. 11B, the private key 1152 is used to decrypt a message. The metadata of the private key 1152 tells us that there are 2 parallel nodes and 3 series nodes. However, node 3 inverts the progress made by node 2, and node 5 inverts progress made by node 4. The private key 1152, while being longer in size and having a different node structure, is effectively the as a smaller private key 1154. However, we can enforce the larger size via checksums that can be incorporated into the public and private key metadata.

Figure 12:
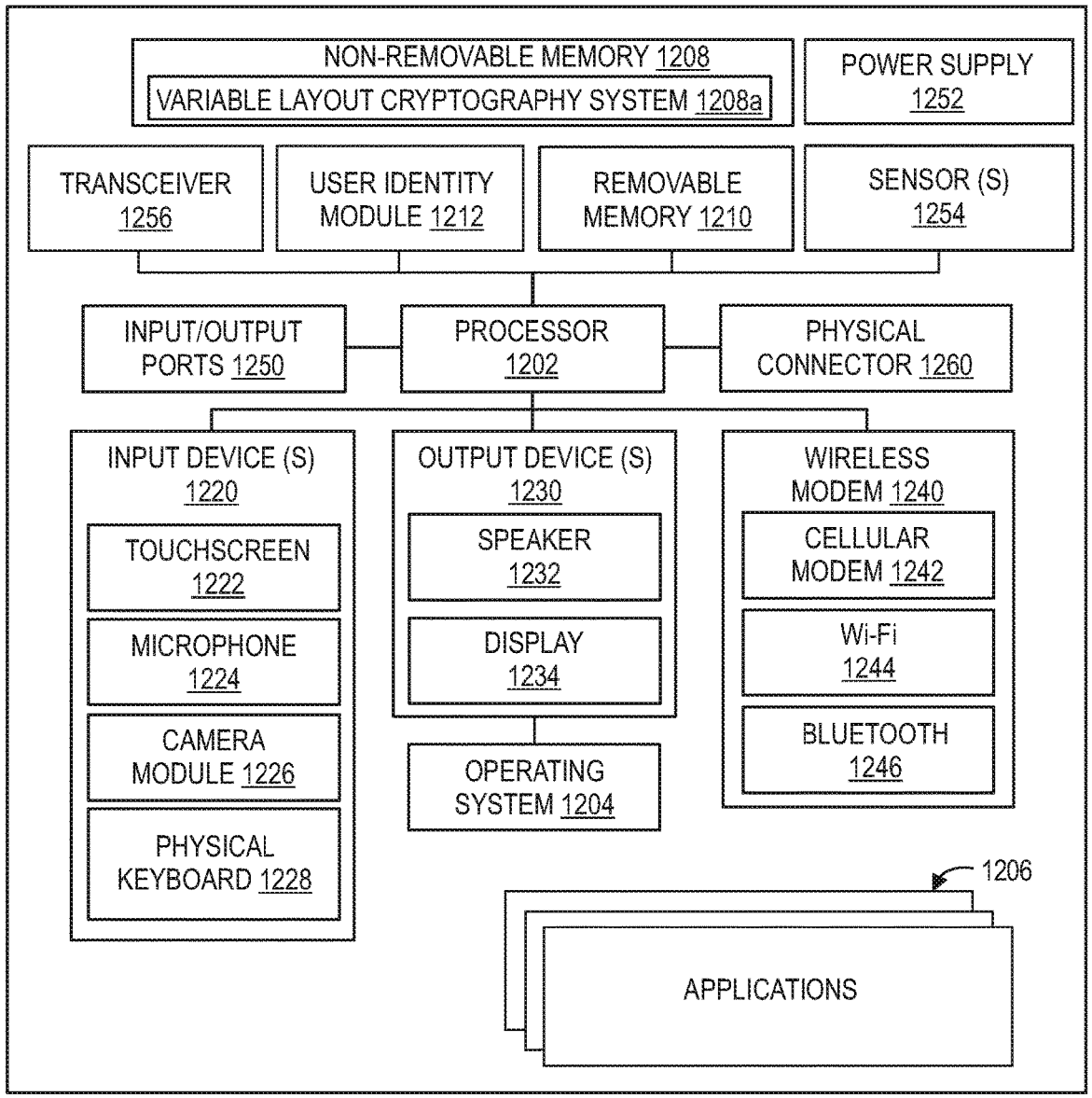
FIG. 12 is a block diagram of an electronic device capable of implementing the various embodiments of the present disclosure, in accordance with an example embodiment.

FIG. 12 shows a simplified block diagram of an electronic device 1200 capable of implementing the various embodiments of the present disclosure. The electronic device 1200 may be an example of the electronic devices 104 and 108. It should be understood that the electronic device 1200 as illustrated and hereinafter described is merely illustrative of one type of device and should not be taken to limit the scope of the embodiments. As such, it should be appreciated that at least some of the components described below in connection with the electronic device 1200 may be optional and thus in an example embodiment may include more, less or different components than those described in connection with the example embodiment of the FIG. 12. As such, among other examples, the electronic device 1200 could be any of an electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1200 includes a controller or a processor 1202 (e.g., a signal processor, microprocessor, ASIC, or other control and processing logic circuitry) for performing such tasks as signal coding, data processing, image processing, input/output processing, power control, and/or other functions. An operating system 1204 controls the allocation and usage of the components of the electronic device 1200 and provides support for one or more programs that implement one or more of the innovative features described herein. The applications 1206 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 1200 includes one or more memory components, for example, a non-removable memory 1208 and/or a removable memory 1210. The non-removable memory 1208 and/or the removable memory 1210 may be collectively known as storage device/module in an embodiment. The non-removable memory 1208 can include RAM, ROM, flash memory, a hard disk, or other well-known memory storage technologies. The non-removable memory 1208 also includes a variable layout cryptography system 1208a that improves the performance of a cryptographic algorithm. The variable layout cryptography system 1208a is similar to the variable layout cryptography system 200 that is discussed in detail with reference to FIG. 2. The removable memory 1210 can include flash memory, smart cards, or a Subscriber Identity Module (SIM). The one or more memory components can be used for storing data and/or code for running the operating system 1204. The electronic device 1200 may further include a user identity module (UIM) 1212. The UIM 1212 may be a memory device having a processor built in. The UIM 1212 may include, for example, a subscriber identity module (SIM), a universal integrated circuit card (UICC), a universal subscriber identity module (USIM), a removable user identity module (R-UIM), or any other smart card. The UIM 1212 typically stores information elements related to a mobile subscriber. The UIM 1212 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1200 can support one or more input devices 1220 and one or more output devices 1230. Examples of the input devices 1220 may include, but are not limited to, a touch screen/a display screen 1222 (e.g., capable of capturing finger tap inputs, finger gesture inputs, multi-finger tap inputs, multi-finger gesture inputs, or keystroke inputs from a virtual keyboard or keypad), a microphone 1224 (e.g., capable of capturing voice input), a camera module 1226 (e.g., capable of capturing still picture images and/or video images) and a physical keyboard 1228. Examples of the output devices 1230 may include, but are not limited, to a speaker 1232 and a display 1234. Other possible output devices can include piezoelectric or other haptic output devices. Some devices can serve more than one input/output function. For example, the touch screen 1222 and the display 1234 can be combined into a single input/output device.

A wireless modem 1240 can be coupled to one or more antennas (not shown in the FIG. 12) and can support two-way communications between the processor 1202 and external devices, as is well understood in the art. The wireless modem 1240 is shown generically and can include, for example, a cellular modem 1242 for communicating at long range with the mobile communication network, a Wi-Fi compatible modem 1244 for communicating at short range with an external Bluetooth-equipped device or a local wireless data network or router, and/or a Bluetooth-compatible modem 1246. The wireless modem 1240 is typically configured for communication with one or more cellular networks, such as a GSM network for data and voice communications within a single cellular network, between cellular networks, or between the electronic device 1200 and a public switched telephone network (PSTN).

The electronic device 1200 can further include one or more input/output ports 1250, a power supply 1252, one or more sensors 1254 for example, an accelerometer, a gyroscope, a compass, or an infrared proximity sensor for detecting the orientation or motion of the electronic device 1200, a transceiver 1256 (for wirelessly transmitting analog or digital signals) and/or a physical connector 1260, which can be a USB port, IEEE 1294 (FireWire) port, and/or RS-232 port. The illustrated components are not required or all-inclusive, as any of the components shown can be deleted and other components can be added.

The disclosed systems and methods with reference to FIGS. 1 to 11, or one or more operations of the method 900 and the flow diagrams 400, 500, 700 and 800 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Various example embodiments offer, among other benefits, techniques for establishing methods, systems and computer program product for improving performance of a cryptographic algorithm. The system splits the data into one or more portions, so each node's key size remains same and only the number of parallel nodes are increased thereby linearly increasing the complexity as opposed to exponential increase in case of long keys. The system uses different structures and layouts for different keys, thereby increasing security as an attacker not only needs to guess what the key is, but also the layout, design, and organization of when to use which keys. The use of different structures and layouts for different keys dramatically increases algorithmic entropy (makes it hard to guess), thereby bolstering our response to brute-force attacks.

Although the invention has been described with reference to specific exemplary embodiments, it is noted that various modifications and changes may be made to these embodiments without departing from the broad spirit and scope of the invention. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus creates a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such are intended to cover the application and/or implementation without departing from the spirit or scope of the claims.

What is claimed is:
1. A method, comprising:
  receiving, by a processor, data to be encrypted;
  generating, by the processor, a primary encryption key for encrypting the data, the primary encryption key comprising metadata and one or more key-blocks, the metadata comprising information about structure of a cryptographic algorithm and the cryptographic algorithm to be used for encryption, the one or more key-blocks comprising one or more keys, wherein the information includes one or more of: number of series nodes, number of parallel nodes, and private key checksums;

splitting, by the processor, the received data into one or more portions based on the information stored in the metadata of the primary encryption key;

processing, by the processor, each portion of the one or more portions with a key of the one or more keys using serial processing;

combining, by the processor, the processed one or more portions to form encrypted data;

receiving, by the processor, the encrypted data to be decrypted;

generating, by the processor, a primary decryption key for decrypting the encrypted data, the primary decryption key comprising secondary metadata and one or more secondary key-blocks, the secondary metadata comprising secondary information about structure of a secondary cryptographic algorithm and the secondary cryptographic algorithm to be used for decryption, the one or more secondary key-blocks comprising one or more secondary keys;

splitting, by the processor, the received encrypted data into one or more secondary portions based on the number of parallel nodes defined in the secondary information contained in the secondary metadata of the primary decryption key;

determining, by the processor, whether the one or more secondary portions are of equal size;

upon determining that the one or more secondary portions are not of equal size: adding, by the processor, a zero to an unequal size portion of the one or more secondary portions to make equal size one or more secondary portions;

performing, by the processor, a base manipulation of the encrypted data;

processing, by the processor, each portion of the one or more secondary portions with a secondary key of the one or more secondary keys using serial processing; and combining, by the processor, the processed one or more secondary portions to form decrypted data.

2. The method as claimed in claim 1, wherein splitting the received data into one or more portions comprises:

splitting, by the processor, the received data into the one or more portions based on the number of parallel nodes;

determining, by the processor, whether the one or more portions are of equal size;

upon determining that the one or more portions are not of equal size, adding, by the processor, a zero to an unequal size portion of the one or more portions to make all portions of equal size; and performing, by the processor, a base manipulation of the data.

3. The method as claimed in claim 1, wherein the cryptographic algorithm is at least one of: a symmetric cryptographic algorithm; and an asymmetric cryptographic algorithm.

4. The method as claimed in claim 3, wherein a node structure of the primary encryption key is different from a node structure of the primary decryption key if the cryptographic algorithm is the asymmetric cryptographic algorithm.

5. The method as claimed in claim 3, wherein the primary decryption key is a private key if the cryptographic algorithm is the asymmetric cryptographic algorithm.

6. The method as claimed in claim 5, wherein splitting the received encrypted data comprises:

performing, by the processor, validation of the private key using private key checksums defined in the information contained in the metadata of the primary encryption key if the cryptographic algorithm is the asymmetric cryptographic algorithm; and upon successful verification of the private key, splitting, by the processor, the received encrypted data into the one or more secondary portions based on the number of parallel nodes defined in the secondary information contained in the secondary metadata of the private key.

7. A system, comprising:

one or more volatile and non-volatile memories configured to store instructions; and a processor configured to execute the instructions stored in the memory and thereby cause the system to perform:

receiving data to be encrypted;

generating primary encryption key for encrypting the data, the primary encryption key comprising metadata and one or more key-blocks, the metadata comprising information about structure of a cryptographic algorithm and the cryptographic algorithm to be used for encryption, the one or more key-blocks comprising one or more keys, wherein the information includes one or more of: number of series nodes, number of parallel nodes, and private key checksums;

splitting the received data into one or more portions based on the information stored in the metadata of the primary encryption key;

processing each portion of the one or more portions with a key of the one or more keys using serial processing;

combining processed one or more portions to form encrypted data;

receiving the encrypted data to be decrypted;

generating a primary decryption key for decrypting the encrypted data, the primary decryption key comprising secondary metadata and one or more secondary key-blocks, the secondary metadata comprising secondary information about structure of the secondary cryptographic algorithm and the secondary cryptographic algorithm to be used for decryption, the one or more secondary key-blocks comprising one or more secondary keys;

splitting the received encrypted data into one or more secondary portions based on the number of parallel nodes defined in the secondary information contained in the secondary metadata of the primary decryption key;

determining whether the one or more secondary portions are of equal size;

upon determining that the one or more secondary portions are not of equal size, adding a zero to an unequal size portion of the one or more secondary portions to make equal size one or more secondary portions;

performing a base manipulation of the encrypted data;

processing each portion of the one or more secondary portions with a secondary key of the one or more secondary keys using serial processing; and combining the processed one or more secondary portions to form decrypted data.

8. The system as claimed in claim 7, wherein for splitting the received data into one or more portions, the system is further configured to:

split the received data into the one or more portions based on the number of parallel nodes;

determine whether the one or more portions are of equal size;

upon determining that the one or more portions are not of equal size, add a zero to an unequal size portion of the one or more portions to make all portions of equal size; and perform a base manipulation of the data.

9. The system as claimed in claim 7,
wherein the cryptographic algorithm is at least one of: a symmetric cryptographic algorithm; and an asymmetric cryptographic algorithm.

10. The system as claimed in claim 9,
wherein a node structure of the primary encryption key is different from a node structure of the primary decryption key if the cryptographic algorithm is the asymmetric cryptographic algorithm.

11. The system as claimed in claim 9,
wherein the primary decryption key is a private key if the cryptographic algorithm is the asymmetric cryptographic algorithm.

12. The system as claimed in claim 11,
wherein for splitting the received encrypted data, the system is further configured to:
perform validation of the private key using private key checksums defined in the information contained in the metadata of the primary encryption key if the cryptographic algorithm is the asymmetric cryptographic algorithm; and
upon successful verification of the private key, split the received encrypted data into the one or more secondary portions based on the number of parallel nodes defined in the secondary information contained in the secondary metadata of the private key.

13. A computer program product comprising at least one non-transitory computer-readable storage medium, the computer-readable storage medium comprising a set of instructions, which, when executed by one or more processors in an electronic device, cause the electronic device to at least:
receive data to be encrypted;
generate a primary encryption key for encrypting the data, the primary encryption key comprising metadata and one or more key-blocks, the metadata comprising information about structure of a cryptographic algorithm and the cryptographic algorithm to be used for encryption, the one or more key-blocks comprising one or more keys, wherein the information includes one or more of: number of series nodes, number of parallel nodes, and private key checksums;
split the received data into one or more portions based on the information stored in the metadata of the primary encryption key;
process each portion of the one or more portions with a key of the one or more keys using serial processing;
combine the processed one or more portions to form encrypted data;
receive the encrypted data to be decrypted;
generate a primary decryption key for decrypting the encrypted data, the primary decryption key comprising secondary metadata and one or more secondary key-blocks, the secondary metadata comprising secondary information about structure of the secondary cryptographic algorithm and the secondary cryptographic algorithm to be used for decryption, the one or more secondary key-blocks comprising one or more secondary keys;
split the received encrypted data into one or more secondary portions based on the number of parallel nodes defined in the secondary information contained in the secondary metadata of the primary decryption key;
determine whether the one or more secondary portions are of equal size;
upon determining that the one or more secondary portions are not of equal size, add a zero to an unequal size portion of the one or more secondary portions to make equal size one or more secondary portions;
perform a base manipulation of the encrypted data;
process each portion of the one or more secondary portions with a secondary key of the one or more secondary keys using serial processing; and
combine the processed one or more secondary portions to form decrypted data.

14. A variable layout cryptography system comprising:
a memory comprising a set of instructions;
a processor in communication with the variable layout cryptography system, the processor configured to execute the set of instructions to:
receive data from input devices and to provide the data to output devices;
perform encryption and decryption on the received data using a cryptographic algorithm;
wherein performing encryption on the received data comprises:
generating a primary encryption key for encrypting the data, the primary encryption key comprising metadata and one or more key-blocks, the metadata comprising information about structure of the cryptographic algorithm and the cryptographic algorithm to be used for encryption, the one or more key-blocks comprising one or more keys, wherein the information includes one or more of: number of series nodes, number of parallel nodes, and private key checksums,
splitting the received data into one or more portions based on the information stored in the metadata of the primary encryption key,
processing each portion of the one or more portions with a key of the one or more keys using serial processing, and
combining the processed one or more portions to form encrypted data;
wherein performing decryption on the received data comprises:
receiving the encrypted data to be decrypted,
generating a primary decryption key for decrypting the encrypted data, the primary decryption key comprising secondary metadata and one or more secondary key-blocks, the secondary metadata comprising secondary information about structure of the secondary cryptographic algorithm and the secondary cryptographic algorithm to be used for decryption, the one or more secondary key-blocks comprising one or more secondary keys,
splitting the received encrypted data into one or more secondary portions based on the number of parallel nodes defined in the secondary information contained in the secondary metadata of the primary decryption key,
determining whether the one or more secondary portions are of equal size,
upon determining that the one or more secondary portions are not of equal size, add a zero to an unequal size portion of the one or more secondary portions to make equal size one or more secondary portions, performing a base manipulation of the encrypted data, processing each portion of the one or more secondary portions with a secondary key of the one or more secondary keys using serial processing, and combining the processed one or more secondary portions to form decrypted data;

store the primary encryption and decryption keys, private keys and other keys that are used for performing the encryption and decryption of the data and to store data associated with one or more cryptographic algorithms;

perform processing, pre-processing and post-processing of the received data; and perform validation of a private key using private key checksums defined in a public key.

15. The variable layout cryptographic system as claimed in claim 14, wherein the cryptographic algorithm is at least one of: a symmetric cryptographic algorithm; and an asymmetric cryptographic algorithm.

\* \* \* \* \*